(12) United States Patent
Van Laar

(10) Patent No.: US 12,202,701 B2
(45) Date of Patent: Jan. 21, 2025

(54) APPARATUS AND METHOD FOR CORRECTING MISALIGNMENT OF A STRIP

(71) Applicant: VMI HOLLAND B.V., Epe (NL)

(72) Inventor: Gerardus Johannes Catharina Van Laar, Epe (NL)

(73) Assignee: VMI HOLLAND B.V. (NL)

( * ) Notice: Subject to any disclaimer, the term of this patent is extended or adjusted under 35 U.S.C. 154(b) by 896 days.

(21) Appl. No.: 16/978,962

(22) PCT Filed: Feb. 18, 2019

(86) PCT No.: PCT/NL2019/050103
§ 371 (c)(1),
(2) Date: Sep. 8, 2020

(87) PCT Pub. No.: WO2019/172749
PCT Pub. Date: Sep. 12, 2019

(65) Prior Publication Data
US 2020/0407180 A1  Dec. 31, 2020

(30) Foreign Application Priority Data
Mar. 6, 2018   (NL) .................................. 2020539

(51) Int. Cl.
*B65H 7/02*     (2006.01)
*B29D 30/46*   (2006.01)
*B65H 7/20*     (2006.01)

(52) U.S. Cl.
CPC ............... *B65H 7/02* (2013.01); *B29D 30/46* (2013.01); *B65H 7/20* (2013.01); *B29D 2030/463* (2013.01); *B65H 2801/93* (2013.01)

(58) Field of Classification Search
CPC ........ B65H 7/02; B65H 2801/93; B65H 7/20; B29D 30/46; B29D 2030/463;
(Continued)

(56) References Cited

U.S. PATENT DOCUMENTS

| 1,860,340 A | * | 5/1932 | Biggert, Jr. ............ | B23D 33/02 |
| | | | | 83/504 |
| 2,106,949 A | * | 2/1938 | Hartman .............. | B26D 7/0608 |
| | | | | 83/431 |

(Continued)

FOREIGN PATENT DOCUMENTS

| CN | 88101656 | 11/1988 | ................ B26D 3/00 |
| CN | 1741898 | 3/2006 | ............. B29D 30/42 |

(Continued)

OTHER PUBLICATIONS

Chinese Official Action dated Jan. 30, 2022 issued in corresponding Chinese Patent Application Serial No. 201980011309.1 (9 pages) with translation.

(Continued)

*Primary Examiner* — Ghassem Alie
(74) *Attorney, Agent, or Firm* — HAYES SOLOWAY P.C.

(57) ABSTRACT

Disclosed is an apparatus and method for correcting misalignment of a strip, wherein the apparatus includes a correction device with an alignment surface for supporting a strip in a support plane, wherein the support plane extends at a support angle with respect to a first vertical plane in a range of five to thirty degrees, wherein the support plane intersects with a second vertical plane that is perpendicular to the first vertical plane at an intersecting line, wherein the correction device further includes one or more correction elements for exerting a displacement force onto said strip in a correction direction parallel to the support plane and transverse to the intersecting line.

34 Claims, 8 Drawing Sheets

(58) Field of Classification Search
CPC ..... B29C 31/08; B23D 33/02; Y10T 83/7847; Y10T 83/6577; Y10T 83/658
USPC .......... 83/13, 421, 423, 504; 198/472.1; 156/502, 304.5, 394.1
See application file for complete search history.

(56) References Cited

U.S. PATENT DOCUMENTS

| | | | | |
|---|---|---|---|---|
| 3,401,930 | A * | 9/1968 | Bishop | B65H 9/166 271/226 |
| 4,769,104 | A * | 9/1988 | Okuyama | B29D 30/3007 156/406.4 |
| 4,813,319 | A | 3/1989 | Weyand | B26D 1/18 |
| 5,167,751 | A * | 12/1992 | Shimizu | B29D 30/3007 156/394.1 |
| 5,884,545 | A * | 3/1999 | Hamby, Jr. | B27B 31/006 83/167 |
| 5,904,788 | A | 5/1999 | Kitajima et al. | 156/64 |
| 6,547,906 | B1 * | 4/2003 | Kolker | B29D 30/44 156/134 |
| 2004/0069156 | A1 * | 4/2004 | Reed | B65G 47/642 198/418.6 |
| 2004/0237737 | A1 * | 12/2004 | Lisec | B65G 49/067 83/13 |
| 2006/0124226 | A1 | 6/2006 | Gutknecht | B29C 35/00 |
| 2008/0184898 | A1 * | 8/2008 | Huang | A47J 37/0857 99/386 |

FOREIGN PATENT DOCUMENTS

| | | | |
|---|---|---|---|
| EP | 0384083 A2 * | 8/1990 | ......... B29D 30/3007 |
| EP | 0 537 348 | 5/1997 | ............ B29D 30/30 |
| EP | 0 844 067 | 5/1998 | ............ B29D 30/44 |
| GB | 684947 | 12/1952 | |
| JP | S62-105626 | 5/1987 | ............ B29D 30/44 |
| JP | H02-165937 | 6/1990 | ............ B29D 30/30 |
| JP | H03-286846 | 12/1991 | ............ B29D 30/30 |
| JP | H07-100953 | 4/1995 | ............ B29D 30/20 |
| JP | H10-146901 | 6/1998 | ............ B29D 30/30 |
| JP | WO 2006103861 A1 * | 10/2006 | ............ B29D 30/70 |
| JP | 2011-88401 | 5/2011 | ............ B29D 30/30 |
| SU | 1565721 | 8/1988 | ............ B29D 30/16 |
| WO | WO2015069102 | 5/2015 | ............ B29D 30/44 |
| WO | WO 2015/194941 | 12/2015 | ............ B29D 30/44 |
| WO | WO 2016/137324 | 9/2016 | ............ B29C 31/08 |
| WO | WO 2016/159759 | 10/2016 | ............ B29D 30/46 |

OTHER PUBLICATIONS

International Preliminary Report on Patentability issued in PCT/NL2019/050103, dated Jun. 3, 2020, 5 pages.
International Search Report and. Written Opinion issued in PCT/NL2019/050103, dated Jul. 11, 2019, 9 pages.
Notice of Reasons for Refusal issued in Japanese Patent Appln. Serial No. 2020-545520, dated May 24, 2022, with English translation, 4 pages.
Russian Decision to Grant dated Sep. 1, 2022 issued in corresponding Russian Patent Application Serial No. 2020132612 (10 pages).

* cited by examiner

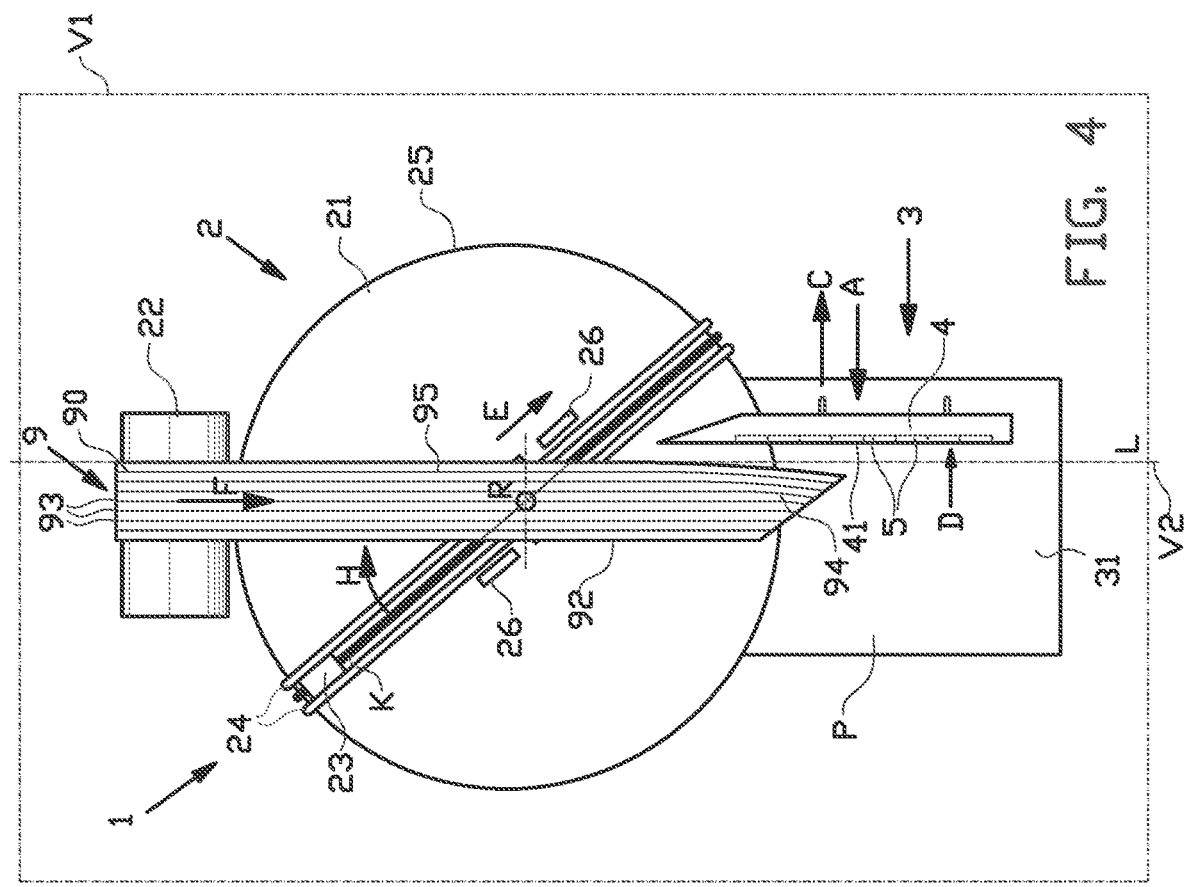
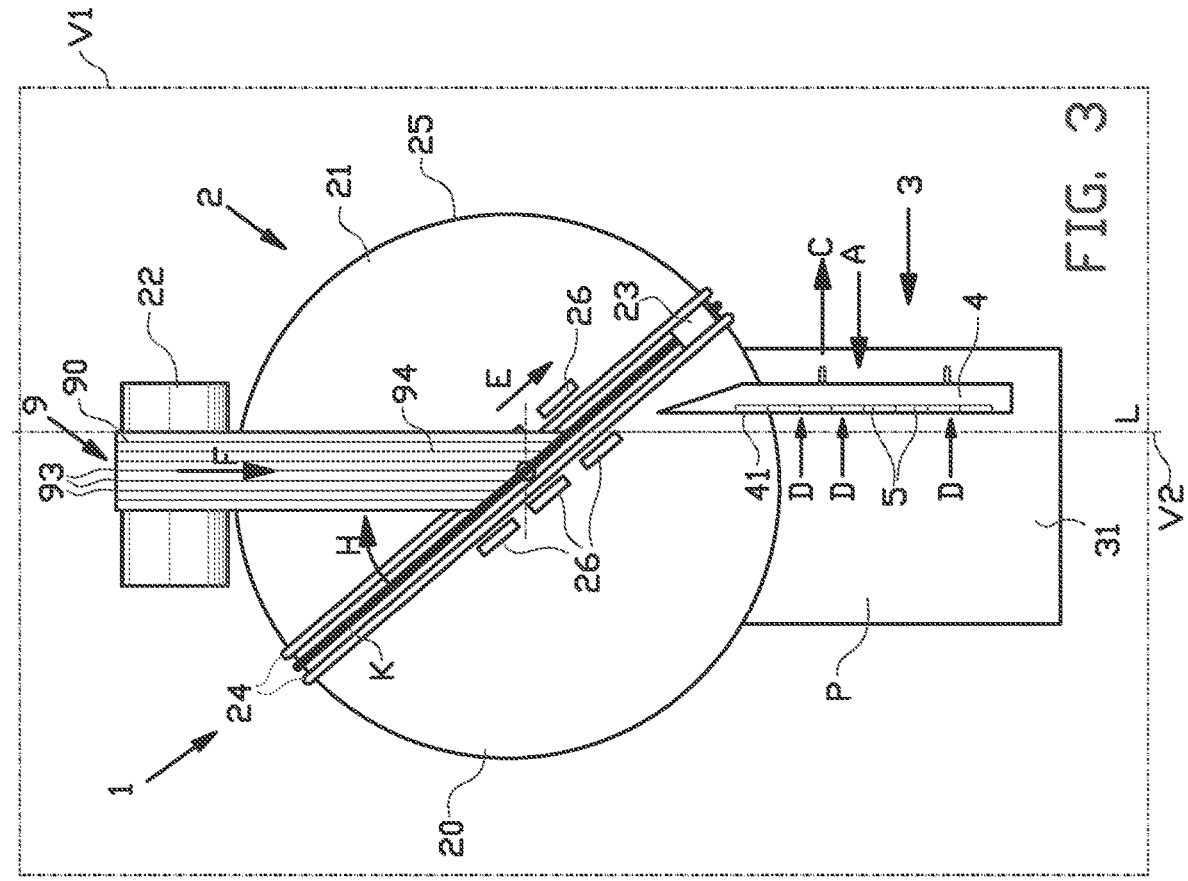

APPARATUS AND METHOD FOR CORRECTING MISALIGNMENT OF A STRIP

BACKGROUND

The invention relates to an apparatus and a method for correcting misalignment of a strip.

WO 2016/159759 A1 discloses a cutting station for a tire building machine, wherein the cutting station comprises a cutting device and a feeding device for feeding a strip of rubber material into the cutting device, wherein the cutting device comprises a cutting table for supporting the strip of rubber material in a support plane and a cutting element for cutting the strip of rubber material along a cutting line that extends parallel to the support plane, wherein the support plane extends at a support angle with respect to a first vertical plane in a range of five to thirty degrees and wherein the feeding device is arranged for feeding the strip of rubber material onto the cutting table in a downward feeding direction parallel to the support plane.

U.S. Pat. No. 5,167,751 A discloses an apparatus for end correction of an automotive tire cord strip. The apparatus comprises a conveyor belt for conveyance of a tire strip member consisting of rubberized steel cords to a tire building drum, which conveyor belt is narrower than the strip member, a supporting plate disposed under the conveyor belt and adapted to support the belt, a guide plate extending in parallel with the lengthwise axis of the conveyor belt and disposed above the supporting plate and on one side thereof in such a manner that it is driven to advance and retreat with respect to the conveyor belt, and a magnet disposed below the supporting plate and toward one side thereof in such a manner that it is driven to advance and retreat with respect to the conveyor belt. The magnet is used to pull the end of the tire strip member against the guide plate.

SUMMARY OF THE INVENTION

The known cutting station according to WO 2016/159759 A1 has the disadvantage that, as a result of the cutting of the strip of rubber material along the cutting line, the freshly created leading end may become slightly warped or deformed, thereby causing a misalignment of said leading end with respect to the rest of the strip, in particular in the longitudinal direction thereof.

U.S. Pat. No. 5,167,751 A has the disadvantage that—in its horizontal configuration and with the magnet disposed below the supporting plate—considerable friction is generated between the tire strip member and the conveyor belt during said pulling, which makes it hard to pull the end of the tire strip member along. Also, the magnetic force will only exceed the friction after the magnet has started, which causes a delay and/or discrepancy in the movement of the magnet and the actual movement of the end of the tire strip member. The tire strip member shift abruptly and unpredictably as the tire strip member briefly loses and regains friction. Moreover, a relatively large magnet is required to sufficiently attract the tire strip member through the supporting plate and the conveyor belt to cause movement of said tire strip member. The known apparatus is therefore relatively bulky and inaccurate when it comes to correcting misalignment of the end of the tire strip member.

It is an object of the present invention to provide an apparatus and a method for improved correction of the misalignment of a strip.

According to a first aspect, the invention provides an apparatus for correcting misalignment of a strip, wherein the apparatus comprises a correction device with an alignment surface for supporting a strip in a support plane, wherein the support plane extends at a support angle with respect to a first vertical plane in a range of five to thirty degrees, wherein the support plane intersects with a second vertical plane that is perpendicular to the first vertical plane at an intersecting line, wherein the correction device further comprises one or more correction elements located at the same side of the alignment surface that is arranged for supporting the strip, wherein the one or more correction elements are arranged for exerting a displacement force onto said strip in a correction direction parallel to the support plane and transverse to the intersecting line.

Because of the steep, nearly vertical orientation of the support plane, the friction between the strip and the alignment surface can be reduced considerably. Also, by providing a displacement force that acts on the strip in the correction direction parallel to the support plane, rather than perpendicular or at an oblique angle to said support plane, it can be prevented that the displacement force adds to the friction. Hence, the strip can be accurately and/or reliably moved under the influence of a relatively small displacement force acting on the strip in the correction direction to at least partially correct warping or deformations in said strip. Abrupt and unpredictable shifting of the strip over the alignment surface can be prevented.

In a preferred embodiment the one or more correction elements are arranged for acting on the strip primarily or solely in the correction direction. Again, in this way, it can be prevented that the displacement force adds to the friction between the strip and the support surface.

In a preferred embodiment the one or more correction elements comprise one or more attraction elements for attracting the strip in the correction direction. By attracting the strip in the correction direction instead of pushing, it can be prevented that the strip is compressed or even damaged before it starts to move in the correction direction.

In a further embodiment the correction device comprises an alignment member with an abutment surface that extends parallel to the intersecting line and faces in an abutment direction opposite to the correction direction. The alignment member can abut the strip in said abutment direction to prevent further movement of the strip in the correction direction.

In a preferred embodiment thereof, said alignment member is movable in the abutment direction. By moving the alignment member, the position in which the strip ultimately abuts the abutment surface can be adjusted.

In a further preferred embodiment thereof the one or more correction elements are provided in or on the alignment member. Consequently, the alignment member can exert the displacement force onto the strip, as well as stop the movement of the strip in the correction direction Cs soon as the strip abuts the abutment surface.

In a further preferred embodiment thereof the one or more correction elements are provided at the abutment surface and face in the abutment direction. Hence, the one or more correction elements can be located as close as possible to and/or act directly onto the strip when said strip is in abutment with the abutment surface.

In a further embodiment the intersecting line is a reference line on the alignment surface for aligning the strip, wherein alignment member is movable in the abutment direction at least up to the reference line. Consequently, the alignment member is able to move the strip up to the reference line, even if said strip is already in abutment with the abutment surface prior to the alignment member arriving at the reference line.

Preferably, the alignment member is movable in the abutment direction from a first position at a first distance from the reference line into a second position at a second distance, smaller than the first distance, from the reference line. In both the first and the second position, the alignment member can still be spaced apart from the reference line. Hence, the movement of the alignment member from the first position to the second position can be used to move the alignment member closer to the strip and thereby increasing the magnitude of the displacement force exerted onto the strip by the one or more correction elements in said alignment member.

More preferably, wherein the displacement force exerted by the one or more correction elements onto the strip is insufficient to displace the strip in the correction direction when the alignment member is between the first position and the second position. Hence, the alignment member can be moved in the range between the first position and the second position without displacing the strip. This prevents that the one or more correction elements have an impact on the position of the strip prior to the actual alignment, e.g. when a cutting process is performed on said strip.

In an exemplary embodiment the first distance is more than eight millimeters or more than ten millimeters. In another exemplary embodiment the second distance is in the range of five to eight millimeters. Such distances have proven sufficient to prevent that the one or more correction elements displace the strip.

In a further embodiment the alignment member is movable in the abutment direction from the second position into a third position at the reference line. This movement can further increase the magnitude of the displacement force exerted onto the strip by the one or more correction elements in said alignment member Preferably, the displacement force exerted by the one or more correction elements onto the strip is sufficient to displace at least a part of the strip in the correction direction into abutment with the abutment surface when the alignment member is between the second position and the third position. Hence, the strip can be pulled into abutment with the abutment surface when the alignment member is moving from the second position towards and/or into the third position.

In another embodiment the strip contains ferromagnetic reinforcement elements, wherein the one or more correction elements comprises one or more correction magnets for magnetically attracting the strip in the correction direction. The displacement force can thus be a magnetic displacement force. Such a force is preferred because it does not require a physical engagement of the strip. Moreover, compared to for example suction, magnetic forces can be exerted more reliably onto a ferromagnetic strip.

Preferably, wherein the one or more correction magnets are permanent magnets. Permanent magnets are relatively simple and do not require an active control. Hence, the alignment member can be relatively simple and does not require electrical connections.

In a further embodiment the one or more correction magnets form a first magnetic field array, wherein the apparatus further comprises a gripper that is positionable in a pick-up position for picking up the strip from the alignment surface, wherein the gripper comprises a plurality of gripper magnets that form a second magnetic field array for retaining the strip to the gripper, wherein the first magnetic field array is at least partially offset with respect to the second magnetic field array. Because of the offset, the magnetic attraction force between the one or more correction magnets and the gripper magnets can be reduced significantly. Hence, the influence of the one or more correction magnets on the gripper magnets can be reduced. The gripper can therefore easily pick-up the strip from the alignment surface, without any significant interference by the one or more correction magnets.

In a preferred embodiment thereof the plurality of correction magnets comprises a first group of correction magnets that face towards the gripper in the pick-up position with a north magnetic polarity and a second group of correction magnets that face towards the gripper in the pick-up position with a south magnetic polarity, wherein the correction magnets of the first group alternate with the correction magnets of the second group within the first magnetic field array. The alternation provides for an at least partially repelling magnet field array.

In another preferred embodiment thereof the pitch between the correction magnets is different from the pitch between the gripper magnets. Hence, the effect of the correction magnets on the gripper magnets can be further reduced.

In a further embodiment the correction device further comprises one or more fixation elements for fixating the strip with respect to the alignment surface after the strip has been displaced by the one or more correction elements. As soon as the one or more fixation elements have fixed the aligned strip on the alignment surface, the alignment member can be moved away in the correction direction, thereby releasing the strip from one or more correction elements.

Preferably, the one or more fixation elements are switchable between an active state for magnetically fixating the strip with respect to the alignment surface and an inactive state for releasing the strip from the alignment surface. The one or more fixation elements can for example be provided as electromagnets which can be easily turned off or as permanent magnets that can be withdrawn away from the alignment surface, e.g. when the strip is picked-up by the previously discussed gripper.

In a further embodiment the correction device comprises an alignment drive for driving the movement of the alignment member in the abutment direction.

Additionally or alternatively, the apparatus further comprises the apparatus further comprises a cutting device, wherein the cutting device comprises a support member with a cutting surface for supporting the strip and a feeding member for feeding the strip onto the cutting surface in a feeding direction that is parallel to the intersecting line, wherein the cutting device is provided with a cutter that is movable along a cutting line for cutting off one or more strips from a continuous strip at a cutting angle that is oblique with respect to the feeding direction, wherein the alignment surface and the cutting surface are coplanar, wherein the apparatus comprises a proximity drive that is arranged for moving the alignment member at least partially onto the cutting surface parallel to the intersecting line into a position as close as possible to the cutting line. Hence, the alignment member can correct the alignment of the tire component with respect to the reference line directly downstream or as close as possible to the cutting line.

Preferably, the support member is rotatable about a rotation axis for adjusting the cutting angle, wherein the proximity drive comprises a transmission for converting the rotation of the support member into the movement of the alignment member parallel to the intersecting line. Hence, the alignment member can be moved automatically by the transmission in response to the rotation.

In a practical implementation thereof, the support member has a circular or substantially circular circumference that is concentric to the rotation axis, wherein the transmission comprises a first belt that extends around the circular circumference of the support member and a second belt that extends in a loop around a first pulley and a second pulley, wherein the alignment member is connected to and movable together with the second belt in a direction parallel to the intersecting line, wherein the first belt is arranged for driving the first pulley in a transmission ratio to the rotation of the support member such that the alignment member is moved in response to the rotation of the support member to maintain the alignment member in a position as close as possible to the cutting line.

According to a second aspect, the invention provides a method for correcting misalignment of a strip using an apparatus according to any one of the aforementioned embodiments, wherein the method comprises the steps of supporting the strip on the alignment surface, using the one or more correction elements to exert a displacement force onto the strip in the correction direction and thereby causing at least a part of said strip to move over the alignment surface in said correction direction.

The method and its embodiments relate to the use of the apparatus according to any one of the previously discussed embodiments. Hence, the method and its embodiments have the same technical advantages, which will not be repeated hereafter.

In a preferred embodiment the one or more correction elements act on the strip primarily or solely in the correction direction. In one embodiment of the method, the apparatus comprises an alignment member with an abutment surface that extends parallel to the intersecting line and faces in an abutment direction opposite to the correction direction, wherein the one or more correction elements are provided in or on the alignment member, wherein the method comprises the step of moving the alignment member in the abutment direction towards the strip.

In a preferred embodiment, the intersecting line is a reference line on the alignment surface for aligning the strip, wherein the method comprises the step of moving the alignment member in the abutment direction at least up to the reference line.

In a further embodiment thereof the method comprises the step of moving the alignment member in the abutment direction from a first position at a first distance from the reference line into a second position at a second distance, smaller than the first distance, from the reference line, wherein the displacement force exerted by the one or more correction elements onto the strip is insufficient to displace the strip in the correction direction when the alignment member is between the first position and the second position.

In a further embodiment thereof the method comprises the step of moving the alignment member in the abutment direction from the second position into a third position at the reference line, wherein the displacement force exerted by the one or more correction elements onto the strip is sufficient to displace at least a part of the strip in the correction direction into abutment with the abutment surface when the alignment member is between the second position and the third position.

In another preferred embodiment of the method, the strip contains ferromagnetic reinforcement elements and the displacement force is a magnetic attraction in the correction direction.

In another embodiment the method comprises the step of cutting off one or more strips along a cutting line at a cutting angle and feeding said cut-off strip in a feeding direction parallel to the intersecting line onto the alignment surface of the correction device, wherein the cutting angle is adjustable, wherein the method further comprises the step of moving the alignment member in a direction parallel to the intersecting line in response to the adjustment of the cutting angle to position and/or maintain the alignment member in a position as close as possible to the cutting line.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which:

FIG. 3 shows a front view of the apparatus according to FIG. 1 for correcting misalignment of a second strip;

FIG. 4 shows a front view of the apparatus according to FIG. 3, during a step of a further method for correcting misalignment of the second strip;

DETAILED DESCRIPTION OF THE INVENTION

Figure 1:
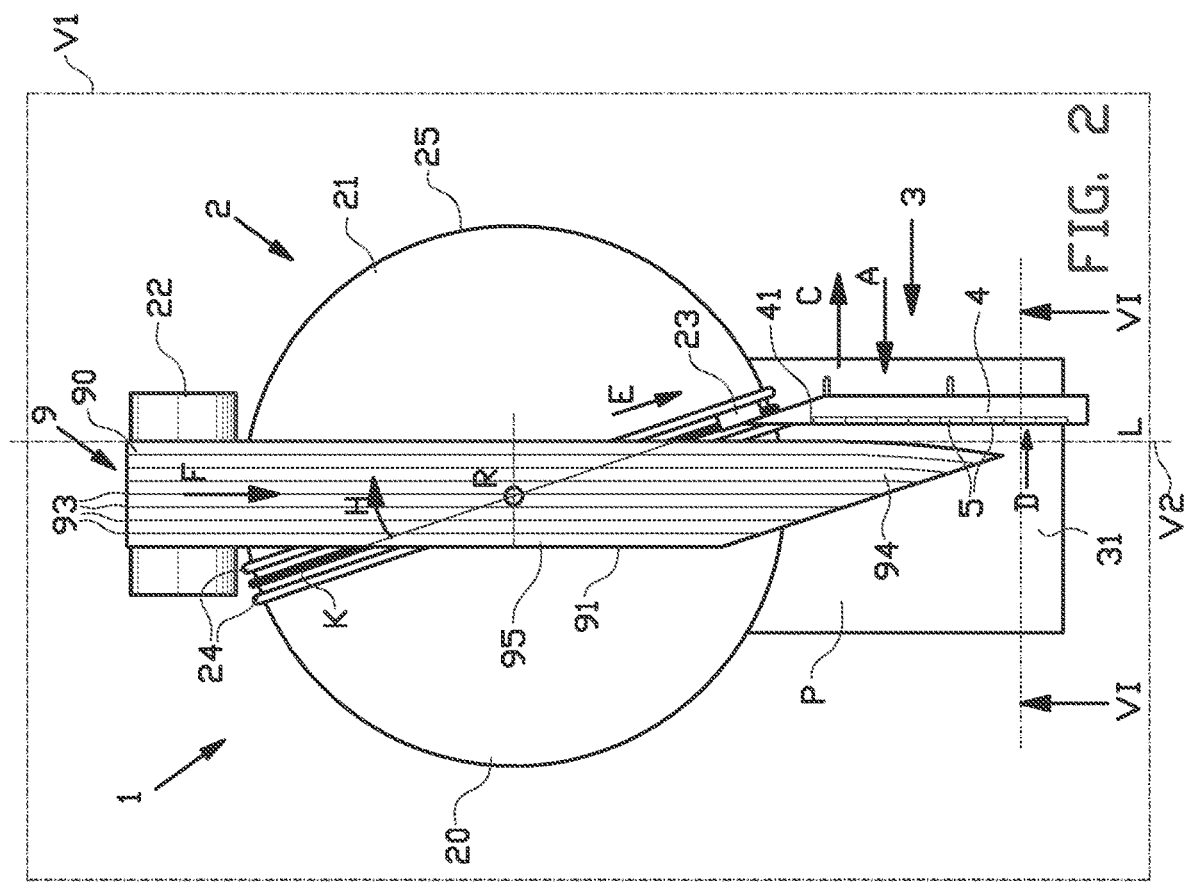
FIG. 1 shows a front view of an apparatus with a cutting device for cutting a first strip and a correcting device for correcting misalignment of the first strip according to a first exemplary embodiment of the invention.
Figure 2:
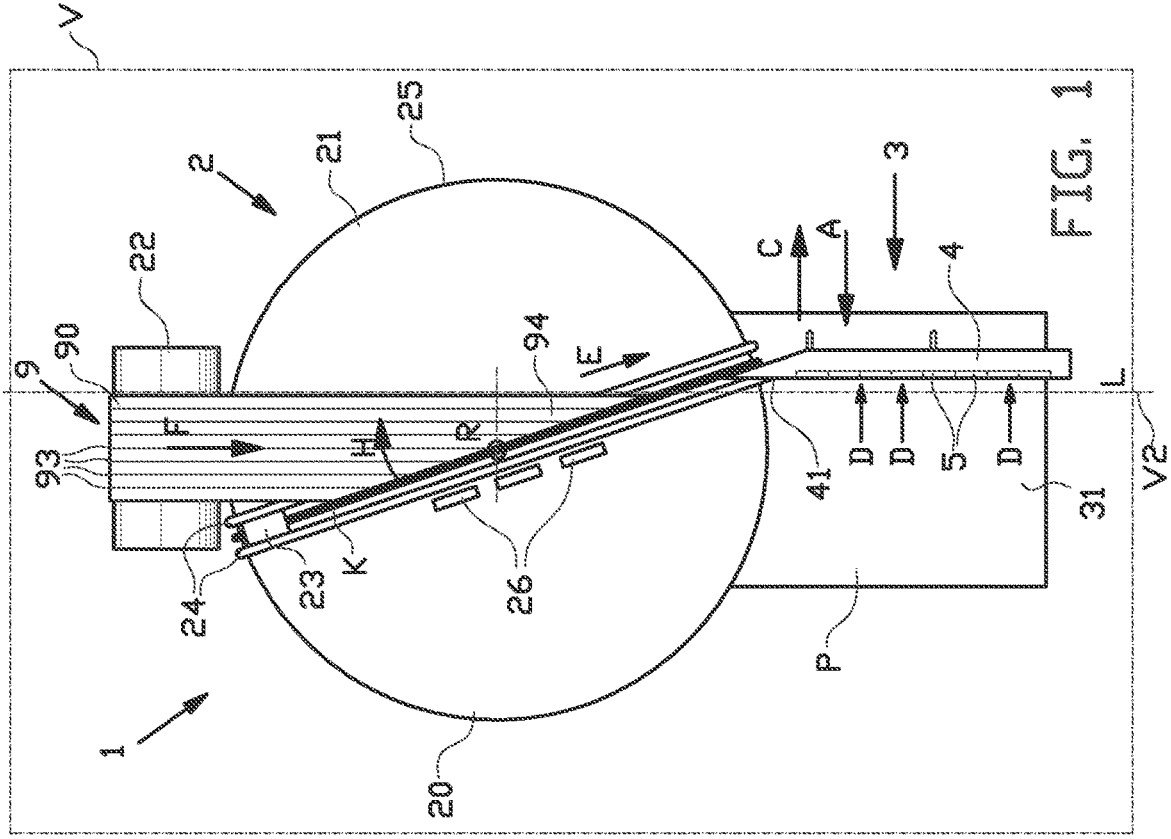
FIG. 2 shows a front view of the apparatus according to FIG. 1, during a step of a method for correcting misalignment of the first strip.

FIGS. 1-4 shows an apparatus 1 for correcting misalignment of the reinforced strips 9, in particular breaker plies. The apparatus 1 comprises a cutting device 2 according to WO 2016/159759 A1 for cutting a continuous strip 90 into one or more cut-to-length strips 91, 92. FIGS. 1 and 2 show the apparatus 1 during steps of a method for manufacturing one or more first reinforced strips 91. FIGS. 3 and 4 shows the same apparatus 1 during steps of a further method for manufacturing one or more second reinforced strips 92. The reinforced strips 91, are preferably reinforced with metal or ferromagnetic reinforcement elements 93. The apparatus 1 further comprises a correcting device 3 according to the present invention for correcting misalignment of the reinforced strips 91, 92.

As shown in FIG. 1, the cutting device 2 comprises a support member 20, in this exemplary embodiment in the form of a cutting table, with a cutting surface 21 that forms a support plane P. The cutting device 2 further comprises a feeding member 22, e.g. a feeding roller, for feeding a continuous strip 90 of elastomeric material, preferably a rubber material, into the apparatus 1 and/or onto the cutting surface 21 in a feeding direction F. Like in WO 2016/159759 A1, the support plane P of the cutting device 2 is placed at a steep, nearly vertical angle, preferably within at a support angle in the range of five to thirty degrees with respect to a first vertical plane V1. The support plane P intersects with a second vertical plane V2 that is perpendicular to the first vertical plane V1 at an intersecting line L. Said intersecting line L can form a reference line (also referenced by the letter L) for aligning the continuous strip 90. The feeding direction F is parallel or substantially parallel to the said intersecting line L. The feeding member 22 is arranged for feeding the continuous strip 90 downwards in the feeding direction F over the steep support plane P. Preferably, the strip 90 is allowed to slide in said support plane P over the cutting surface 21 solely under the influence of gravity.

The cutting device 2 further comprises a cutter that is arranged for cutting the continuous strip 90 into the one or more first strips 91 as shown in FIGS. 1 and 2 or the one or more second strips 92 as shown in FIGS. 3 and 4. The cutting device 2 comprises one or more guides 24 for guiding the cutter 23 along a cutting line K across the cutting surface 21 at a cutting angle H that is oblique with respect to the feeding direction F. Preferably, the cutting angle H is adjustable in a range between fifteen and sixty degrees with respect to the feeding direction F. In this exemplary embodiment, the cutting surface 21 is rotatable about a rotation axis R that extends normal to the cutting surface 21. The one or more guides 24 are mounted to and rotatable together with the cutting surface 21 to adjust the cutting angle H. Preferably, the support member 20 has an at least partly circular circumference 25, concentric to the rotation axis R and/or wherein the rotation axis R is located at the center of the at least partly circular circumference 25.

As further shown in FIG. 1, the cutting device 2 comprises one or more retaining magnets 26 arranged at or near the cutting line K, preferably on both sides of the cutting line K, for retaining the strip 90 during the cutting. The retaining magnets 26 can be permanent magnets which can be retracted into a position spaced apart from the strip 90 by a retraction mechanism (not shown) or electromagnets which are arranged to be switched on and off.

As shown in FIGS. 1-5, the correction device 3 comprises an alignment surface 31 for receiving and/or supporting one of the one or more first strips 91 or the one or more second strips 92. The alignment surface 31 extends in the same support plane P as and/or at the same steep support angle as the cutting surface 21 of the cutting device 2. In this example, the strip 91, 92 is fed onto the alignment surface 31 from the cutting surface 21, preferably solely under the influence of gravity. The alignment surface 31 itself remains stationary.

As shown in FIGS. 1-4, the correction device 3 is provided with an alignment member 4 for abutting the strip 91, 92 in an abutment direction A parallel to the support plane P and transverse or perpendicular to the intersecting line L. As shown in more detail in FIG. 5, the alignment member comprises an alignment body 40 with an abutment surface 41 that extends parallel to the intersection line L and that faces in an abutment direction A parallel to the support plane P and transverse or perpendicular to the intersecting line L towards the strip 91, 92.

Figure 5:
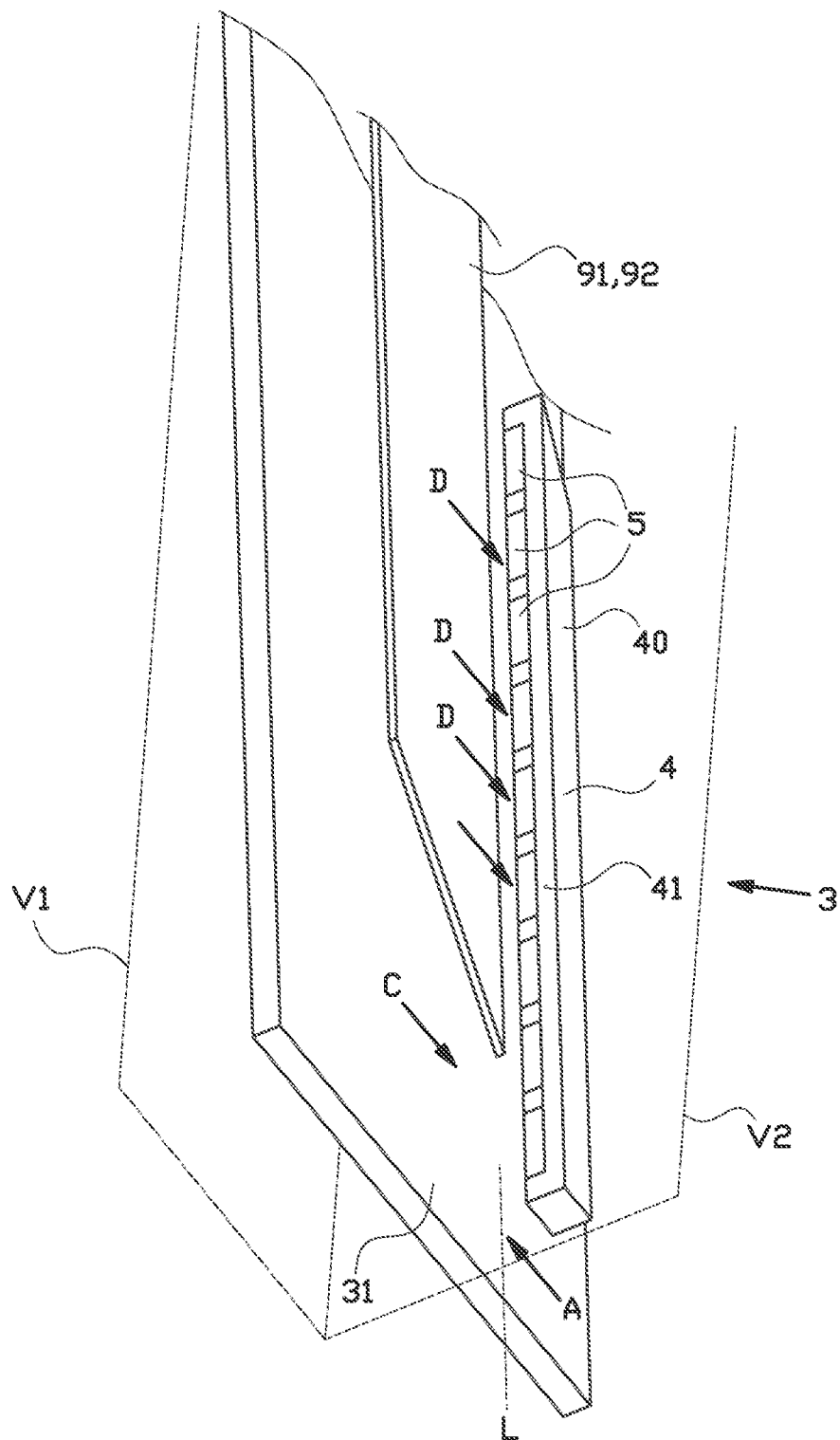
FIG. 5 shows an isometric view of the correcting device of FIG. 1.

As best seen in FIG. 5, the correction device 3 further comprises one or more correction elements 5 for exerting a displacement force D onto said strip 91, 92 in the correction direction C parallel to the support plane P and transverse to the intersecting line/reference line L. In this exemplary embodiment, the one or more correction elements 5 comprise one or more attraction elements for attracting the strip 91, 92 in the correction direction C. More in particular, the one or more correction elements 5 comprise one or more magnets, preferably permanent magnets, to magnetically attract the ferromagnetic material in the strip 91, 92.

As clearly shown in FIG. 5, the one or more correction elements 5 are located at the same side of the alignment surface 31 that is arranged for supporting the strip 91, 92, i.e. the upwardly facing side of the alignment surface 31. As such, the one or more correction elements 5 are arranged for acting on the strip 91, 92 primarily in the correction direction C parallel to said support plane P. More in particular, the one or more correction elements 5 are arranged for acting on the strip 91, 92 solely in the correction direction C. This is also reflected by the arrows of the displacement force D, which in FIG. 5 are parallel to the correction direction C.

In this exemplary embodiment, the one or more correction elements 5 are provided in or on the alignment member 4. In particular, the one or more correction elements 5 are provided at the abutment surface 41 and face in the abutment direction A.

As shown in FIGS. 1-4, the alignment member 4 is movable in the abutment direction A parallel to the support plane P and transverse to the intersecting line L and in a correction direction C, opposite to the abutment direction A. By moving the alignment member 4 away from the reference line L, the strip 90 can be supplied onto the alignment surface 31 without the alignment member 4 obstructing said supply. The alignment member 4 can subsequently be moved back in the abutment direction A towards the reference line L to define a position in which it can abut the strip 91, 92 after cutting.

Preferably, the alignment member 4 is further movable back and forth in the feeding direction F, parallel to, substantially parallel to and/or along the reference line L, for positioning the alignment member 4 along the reference line L as close as possible to the cutting line K. Preferably, the alignment member 4 is provided with a sharp tapering end 42 facing towards the cutting line K that allows the abutment surface 41 at said tapering end 42 to extends as close as possible towards the cutting line K. In such a way, the abutment surface 41 can abut a substantial part if not substantially the entire length of the strip 91, 92 in the feeding direction F.

Figure 6:
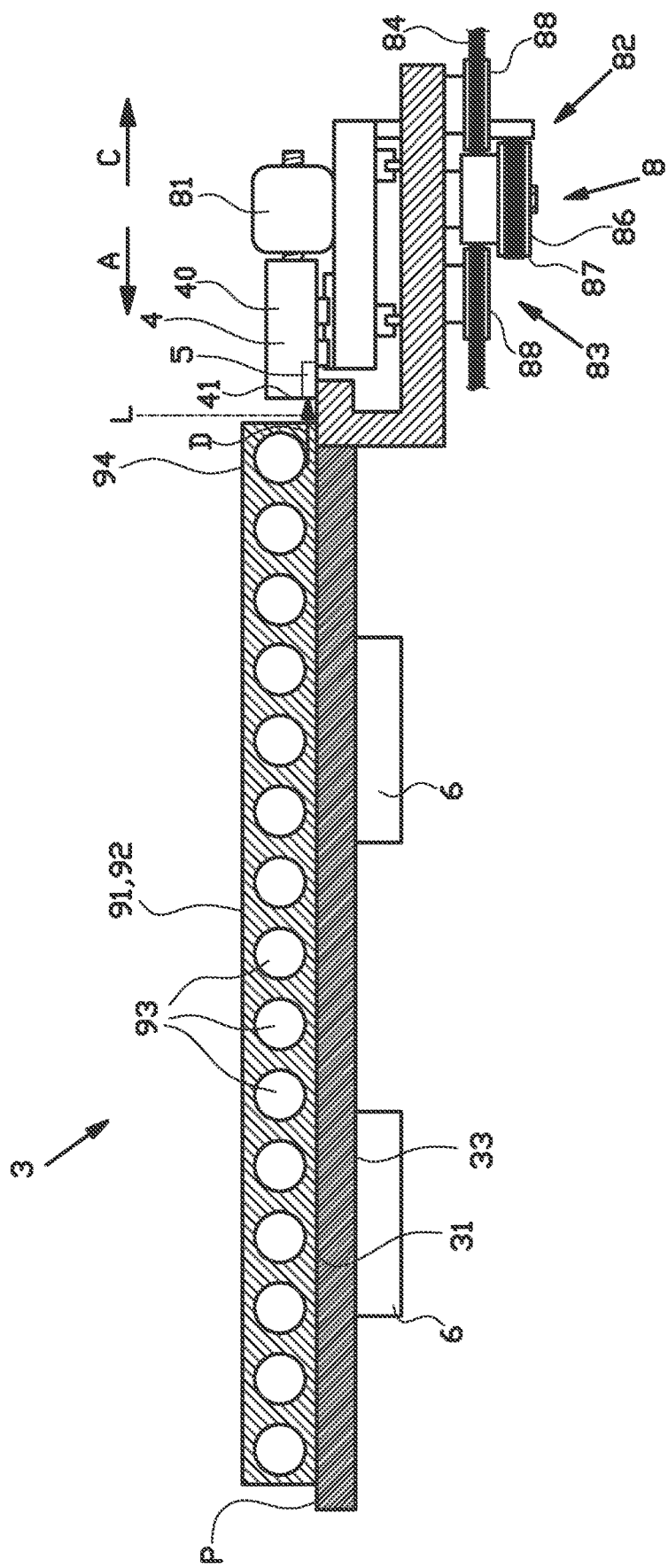
FIG. 6 shows a bottom view in cross section of the apparatus according to the line VI-VI in FIG. 2.
Figure 7:
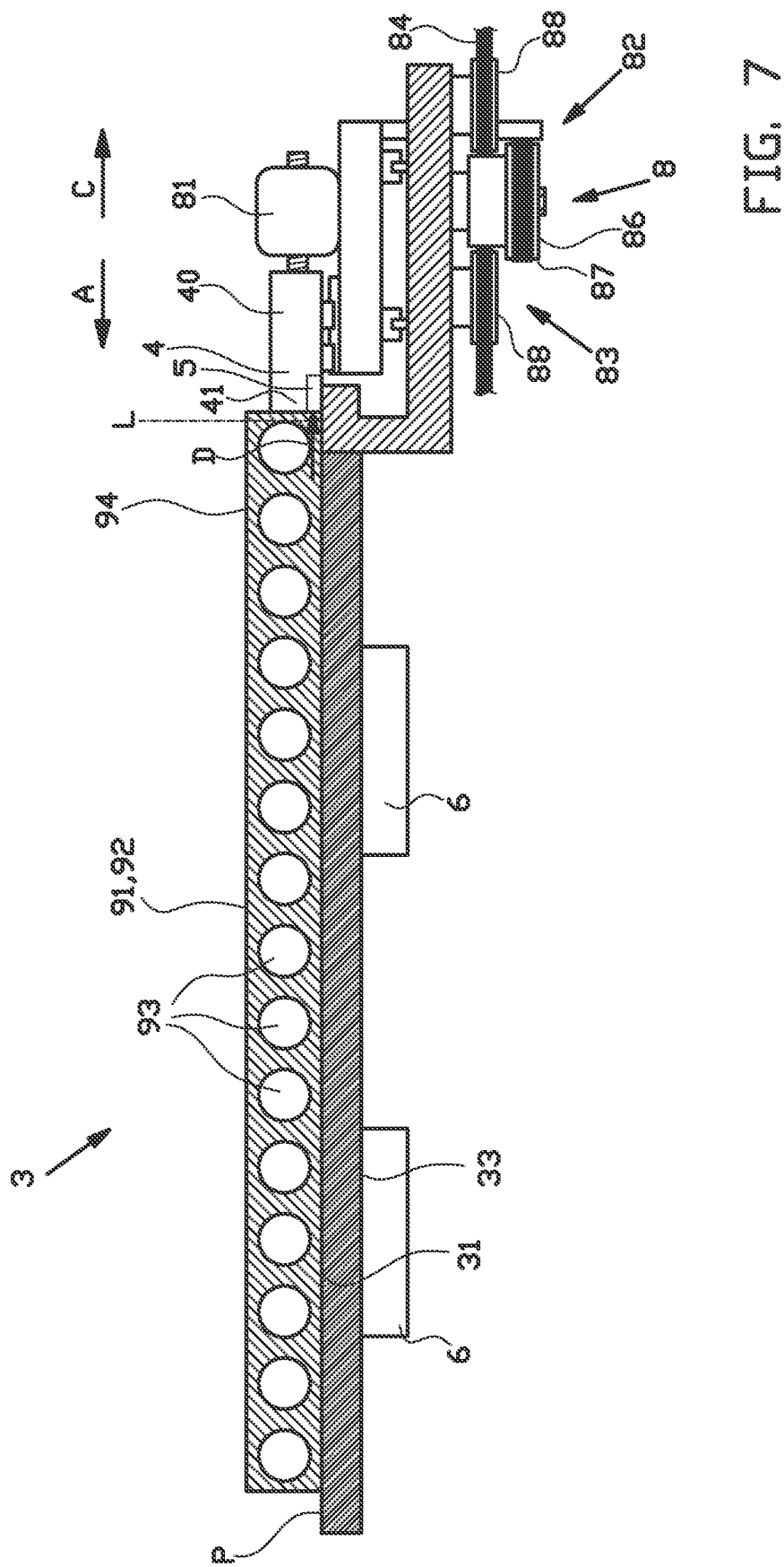
FIGS. 7 and 8 show the steps of correcting the misalignment of the first (or second) strip in more detail.
Figure 8:
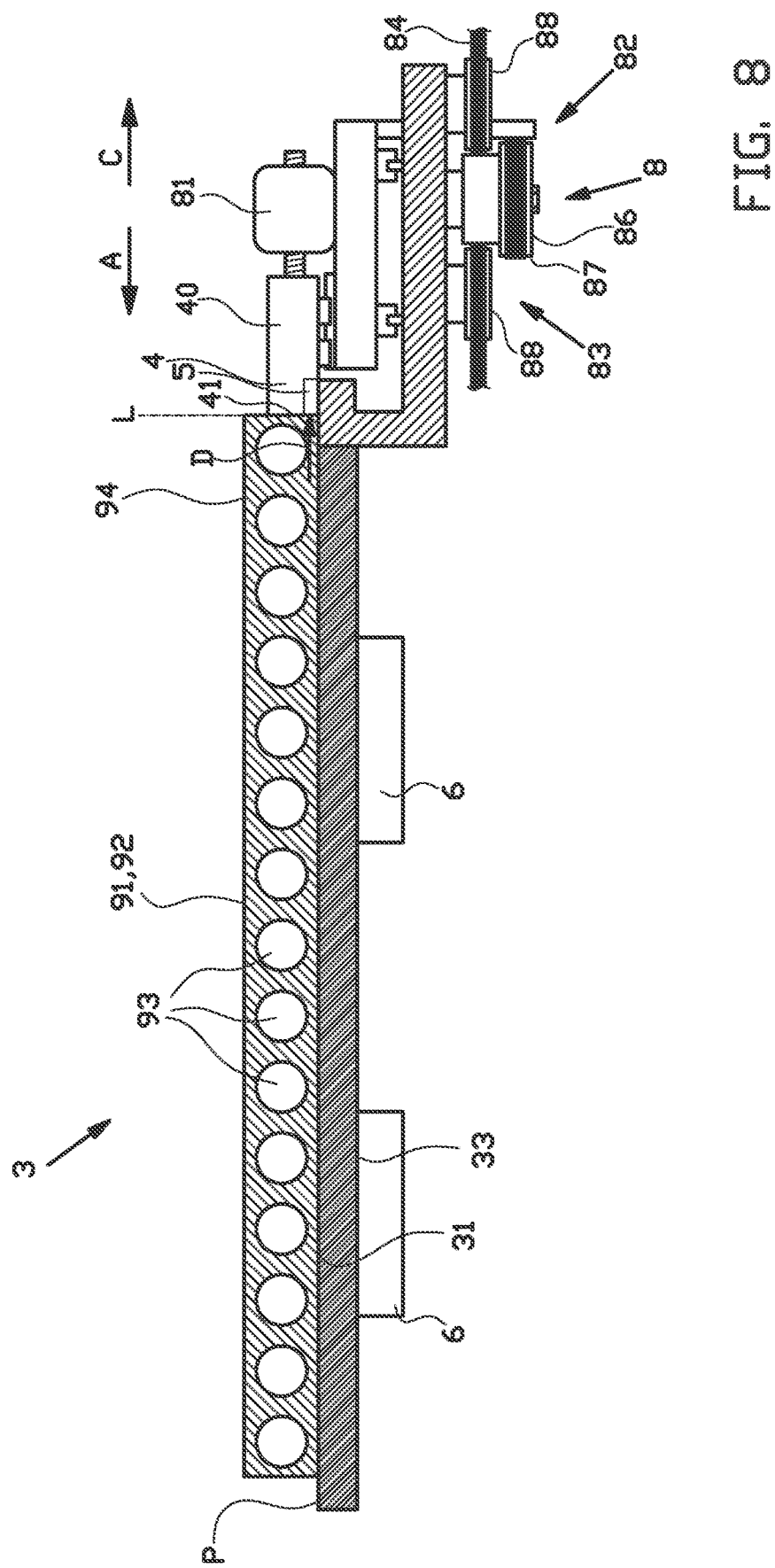

As shown in FIGS. 6, 7 and 8, the apparatus 1 comprises an alignment drive 81 for driving the movements of the alignment member 4 in the abutment direction A and the correction direction C. The alignment drive 81 is preferably formed by a linear drive, most preferably a spindle drive. However, it will be apparent to one skilled in the art that various alternative drives will be suitable for driving the movement of the alignment member 4 in the abutment direction A and the correction direction C.

Figure 9:
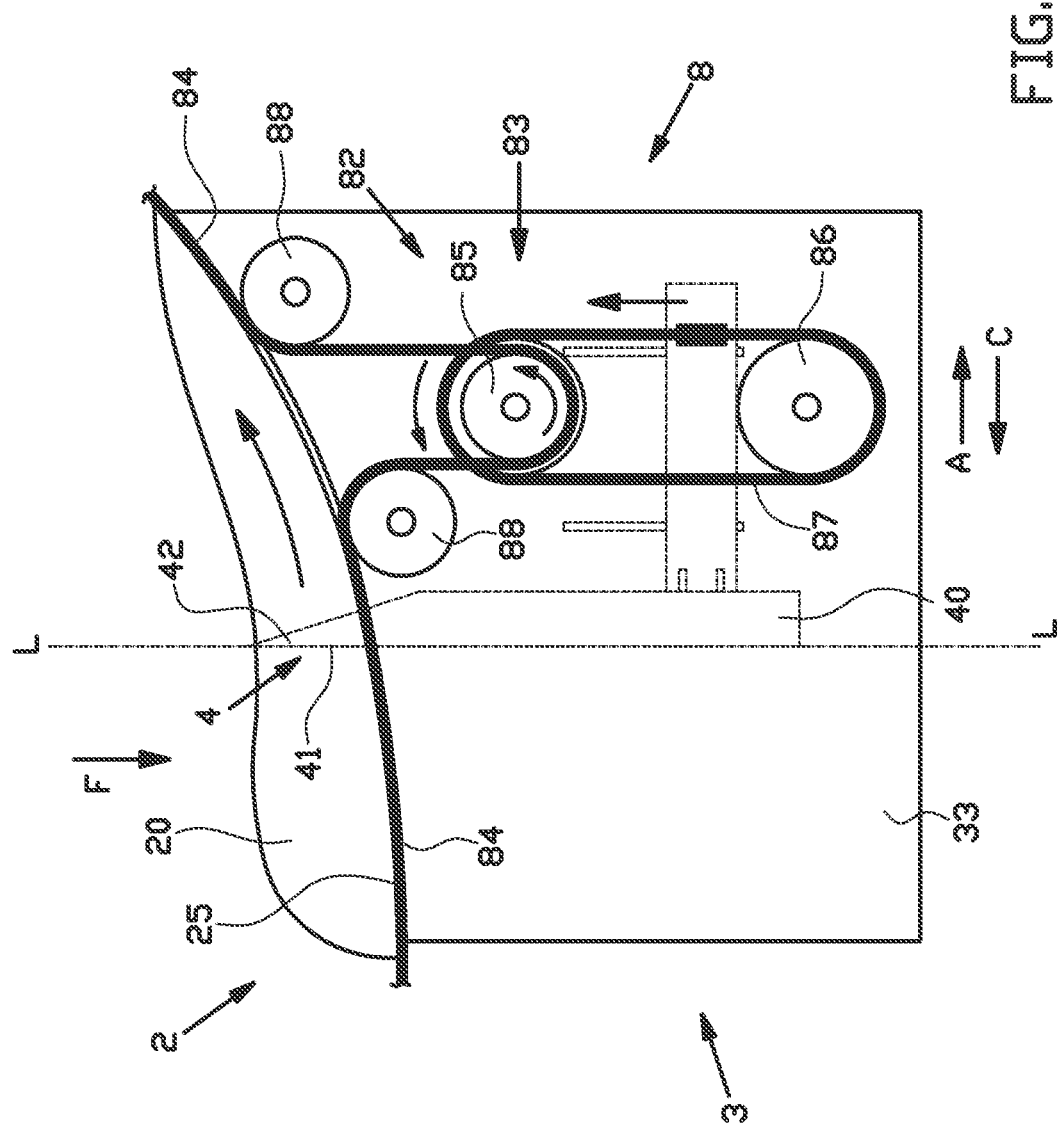
FIG. 9 shows a rear view of the apparatus according FIG. 1.

As shown in FIG. 9, the apparatus 1 further comprises a proximity drive 82 for driving the movement of the alignment member 4 back and forth in the feeding direction F. The proximity drive 82 can be formed by a linear drive, e.g. a spindle drive. However in the embodiment as shown in FIG. 9, the proximity drive 82 comprises a transmission 83 for converting the movement of the support member 20 into a movement of the alignment member 4 back and forth in the feeding direction F and/or along the reference line L. In the embodiment as shown, the support member 20 has a fully circular circumference 25 and is rotatable about the rotation axis R for setting the cutting angle H. This rotation is converted by the transmission 83 into a linear or substantially linear back and forth movement of the alignment member 4 in the feeding direction F.

The transmission 83 comprises a first belt 84 that is placed around the circular circumference 25 of the support member 20. The transmission 83 is further provided with a first pulley 85, a second pulley 86 and a second belt 87 that is placed in a loop around the first pulley 85 and the second pulley 86. The first belt 84 is connected to and/or placed around the first pulley 85 to drive the rotation of said first pulley 85 in a transmission ratio to the rotation of the support member 20. The alignment member 4 is fixedly connected to a part of the second belt 87 so as to be movable together with said part of the second belt 87.

The diameter of the first pulley 85 is chosen such that an appropriate transmission ratio between the rotation of the support member 20 and the first pulley 85 is obtained. The transmission ratio is preferably one that causes an appropriate displacement of the alignment member 4 with respect to and/or in relation to the rotation of the support member 20. An appropriate displacement is aimed at positioning and/or maintaining the alignment member 4 along the reference line L in a position as close as possible to the cutting line K.

Preferably, the transmission 83 comprises a plurality of guide pulleys 88 for redirecting and/or guiding at least a part of the first belt 84 away from the circumference 25 of the support member 20 and in a loop around the first pulley 85.

As shown in FIGS. 6-8, the correction device 3 further comprises one or more fixation elements 6 for fixating the strip 91, 92 with respect to the alignment surface 31 after the strip 91, 92 has been displaced by the one or more correction elements 5. The one or more fixation elements 6 preferably comprise one or more electromagnets at or below the alignment surface 31, wherein the one or more fixation electromagnets 31 are switchable between an active state for magnetically fixating the strip 91, 92 with respect to the alignment surface 31 and an inactive state for releasing the strip 91, 92 from the alignment surface 31. Alternatively, the one or more fixation elements may comprise permanent magnets (not shown) which can be withdrawn away from the alignment surface 31 to release the strip 91, 92 from the alignment surface 31.

Figure 10:
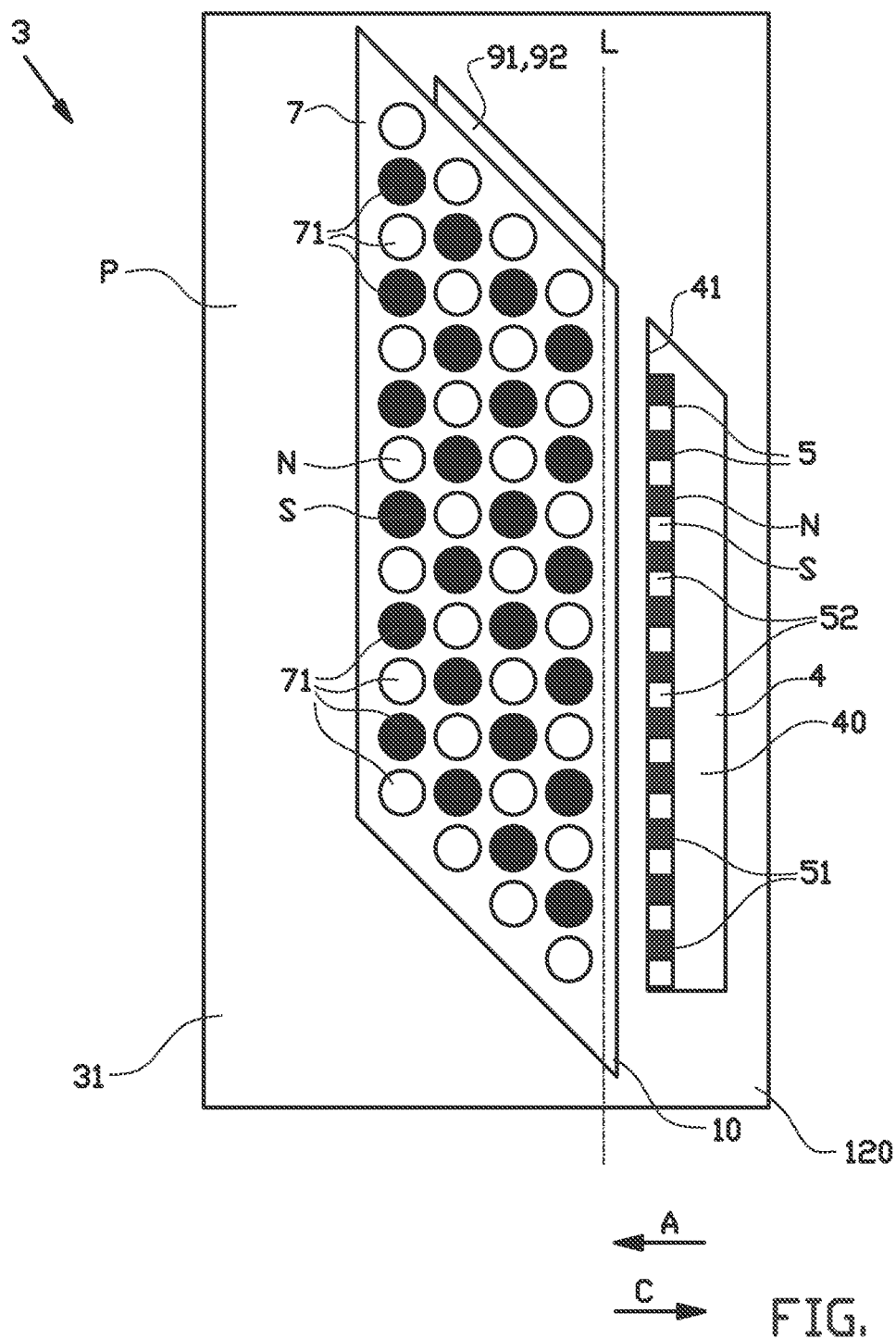
FIG. 10 shows the interaction between the correction device and an external gripper for picking up the strip from the correction device.

FIG. 10 shows an optional embodiment in which the apparatus 1 further comprises a gripper 7 that is positionable in a pick-up position for picking up the strip 91, 92 from the alignment surface 31. Said gripper 7 comprises a plurality of gripper magnets 71, 72 for magnetically retaining the strip 91, 92 to the surface of the gripper 7. When used in combination with the previously discussed fixation magnets 31, the fixation magnets 31 can be switched off or withdrawn as soon as the gripper magnets 71, 72 have retained the strip 91, 92 to the surface of the gripper 7. However, while the fixation magnets 31 can be switched off or withdrawn, the one or more correction magnets 5 in the alignment member 4 are still in close proximity to the gripper 7. Hence, their magnetic fields could interfere with the magnetic pick-up by the gripper 7.

Therefore, in this particular embodiment, the one or more correction elements 5 comprises a plurality of correction magnets 51, 52 that form a first magnetic field array and the gripper magnets 71, 72 form a second magnetic field array. The first magnetic field array is at least partially offset with respect to the second magnetic field array. In particular, the plurality of correction magnets 51, 52 comprises a first group of correction magnets 51 that face towards the gripper 7 in the pick-up position with a north magnetic polarity N and a second group of correction magnets 52 that face towards the gripper in the pick-up position with a south magnetic polarity S, wherein the correction magnets 51 of the first group alternate with the correction magnets 52 of the second group within the first magnetic field array. Although each correction magnet 51, 52 individually is still able to attract the strip 91, 92, the alternation provides for an at least partially repelling magnet field array with respect to the field array of the gripper magnets 71, 72 to reduce the influence of the correction magnets 51, 52 on the gripper magnets 71, 72.

Preferably, the pitch, i.e. the heart-to-heart distance, between the correction magnets 51, 52 of the first magnetic field array is different from the pitch of between the gripper magnets 71, 72 of the second magnetic field array, e.g. the pitch between the correction magnets 51, 52 may be at least twice as small as the pitch between the gripper magnets 71, 72. Hence, reduced pitch causes two of the correction magnets 51, 52 to be located opposite to only one of the gripper magnets 71, 72, thereby considerably reducing their effect on the single gripper magnet 71, 72.

A method for correcting misalignment of the strips 91, 92 will be described hereafter in detail with reference to FIGS. 1-10.

FIG. 1 shows the situation in which the support member 20 has been rotated about the rotation axis R such that the cutting line K extends at a chosen cutting angle H. A strip 90 has been supplied by the supply member 22 in the feeding direction F onto the cutting surface 21 of the support member 20. The cutter 23 has been moved in a cutting direction E along the cutting line K to cut off a leading end of the strip 90 at the cutting angle H. During the cutting, the strip 90 is retained by the retaining magnets 26. After the cutting, the retaining magnets 26 are retracted into the cutting surface 21 and/or deactivated to release the strip 90. The cutter 23 is returned to the position as shown in FIG. 1 for a subsequent cutting step. The cutting has created a new, triangular leading end 94. Typically, the leading end 94 is slightly deformed by the cutting step, as the leading end 94 has a relatively small contact surface with the cutting surface 21 and can be displaced relatively easily by the cutter 23 with respect to the rest of the strip 90. The deformation in FIG. 1 is exaggerated to clearly illustrate the problem underlying the present invention. The alignment member 4 has been moved in the correction direction C into a first position spaced apart from the reference line L to allow the strip 90 to be fed onto the alignment surface 31 in the feeding direction F without the alignment member 4 hindering said feeding.

FIG. 2 shows the situation in which the strip 90 with the newly created leading end 94 is driven or has been allowed to move further over cutting surface 21 in the feeding direction F so that at least the leading end 94 of the strip 90 is positioned on and/or supported by the alignment surface 31. Subsequently, the cutter 23 has been moved again in the cutting direction E along the cutting line K to cut off the aforementioned first strip 91 from the strip 9 at the cutting angle H. The cutting has created a triangular trailing end 95 similar to the leading end 94. The leading end 94 is still slightly deformed by the cutting step of FIG. 1. Now, the alignment member 4 can be moved in the abutment direction A back towards the reference line L.

As shown in FIGS. 3 and 4, the support member 20 can be rotated about the rotation axis R such that the cutting line K extends at a different cutting angle H with respect to the cutting angle H in FIGS. 1 and 2. Consequently, the strip 90 can be cut into one or more second strips 92 for a different batch. During the rotation, the position of the alignment member 4 is adjusted, preferably automatically with the use of a suitable mechanism, e.g. the proximity drive 82 as shown in FIG. 10, to be as close as possible to the cutting line K to provide an optimal alignment of the strip 91, 92 during the subsequent steps of the method. The following steps of the method apply to any one strip 91, 92 cut at the cutting angles H as shown in FIGS. 1-4 or any other cutting angles H within the adjustable range of the support member 20.

FIG. 6 shows the alignment member 4 in the first position corresponding to the first position as shown in FIGS. 1-4, spaced apart from the reference line L as the strip 90 is fed onto the alignment surface 31. Once the strip 91, 92 is approximately in position on the alignment surface 31, e.g. within five millimeters from the reference line L, the alignment drive 81 is actuated to move the alignment member 4 from the first position, as shown in FIG. 6, at a first distance from the reference line L towards a second position, as shown in FIG. 7, at a second distance from the reference line L. The second distance is smaller than the first distance. In particular, the first distance is more than eight millimeters or more than ten millimeters and the second distance is in the range of five to eight millimeters. Preferably, the displacement force D exerted by the one or more correction elements 5 onto the strip 91, 92 is insufficient to displace the strip 91, 92 in the correction direction C when the alignment member 4 is between the first position and the second position. Hence, during the movement of the alignment member 4 from the first position to the second position, the magnitude of the displacement force D exerted onto the strip 91, 92 does not exceed the friction between the strip 91, 92 and the alignment surface 31. However, said magnitude will increase as the alignment member 4 moves closer and as soon as the alignment member 4 arrives in the second position, as shown in FIG. 7, or when the alignment member 4 is in any position between the second position, as shown in FIG. 7, and a third position, as shown in FIG. 8, at the reference line L, the displacement force D exerted by the one or more correction elements 5 onto the strip 91, 92 will be sufficient to displace at least a part of the strip 91, 92 in the correction direction C into abutment with the abutment surface 41.

As shown in FIG. 7, the strip 91, 92 may be pulled into abutment against the abutment surface 41 while the alignment member 4 has not yet moved into the third position at the reference line L. Hence, the strip 91, 92 may actually be pulled beyond the reference line L. Subsequently, as the alignment member 4 continues to move in the abutment direction A towards the third position as shown in FIG. 8, the strip 91, 92 retained thereto will also be displaced in the abutment direction A and will ultimately be forced into alignment along the reference line L.

As soon as the strip 91, 92 has been aligned or corrected along the reference line L, the one or more fixation elements 6 underneath the alignment surface 31 may be switched to an active state to fix the aligned or corrected position of the strip 91, 92 on the alignment surface 31. The alignment member 4 may subsequently be retracted in the correction direction C into the first position as shown in FIG. 6 for a next cycle of the method.

Next, the aligned or corrected strip 91, 92 may be picked-up by the gripper 7 as shown in FIG. 10, e.g. in the manner as previously discussed, for transfer to a downstream assembly unit (not shown).

It is to be understood that the above description is included to illustrate the operation of the preferred embodiments and is not meant to limit the scope of the invention.

From the above discussion, many variations will be apparent to one skilled in the art that would yet be encompassed by the scope of the present invention.

LIST OF REFERENCE NUMERALS 1 apparatus
2 cutting device
20 support member
21 support surface
22 feeding member
23 cutter
24 guide
25 circular circumference
26 retaining magnets
3 correction device
31 alignment surface
4 alignment member
40 alignment body
41 abutment surface
42 tapering end
5 one or more correction elements
51 correction magnet
52 correction magnet
6 one or more fixation elements
7 gripper
71 gripper magnet
72 gripper magnet
81 alignment drive
82 proximity drive
83 transmission
84 first belt
85 first pulley
86 second pulley
87 second belt
90 continuous strip
91 first strip
92 second strip
93 reinforcement element
94 leading end
95 trailing end
A abutment direction
C correcting direction
D displacement force
F feeding direction
H cutting angle
K cutting line
L intersecting line/reference line
P support plane
V1 first vertical plane
V2 second vertical plane

The invention claimed is:

1. An apparatus for correcting misalignment of a strip, wherein the apparatus comprises a correction device with an alignment surface for supporting a strip in a support plane, wherein the support plane extends at a support angle with respect to a first vertical plane in a range of five to thirty degrees, wherein the support plane intersects with a second vertical plane that is perpendicular to the first vertical plane at an intersecting line, wherein the correction device further comprises one or more correction elements located at the same side of the alignment surface that is arranged for supporting the strip, wherein the one or more correction elements are arranged for exerting a displacement force onto said strip in a correction direction parallel to the support plane and transverse to the intersecting line, wherein the one or more correction elements comprise one or more attraction elements for attracting the strip in the correction direction.

2. The apparatus according to claim 1, wherein the one or more correction elements are arranged for acting on the strip primarily in the correction direction.

3. The apparatus according to claim 2, wherein the one or more correction elements are arranged for acting on the strip solely in the correction direction.

4. The apparatus according to claim 1, wherein the correction device comprises an alignment member with an abutment surface that extends parallel to the intersecting line and faces in an abutment direction opposite to the correction direction.

5. The apparatus according to claim 4, wherein the alignment member is movable in the abutment direction.

6. The apparatus according to claim 5, wherein the correction device comprises an alignment drive for driving the movement of the alignment member in the abutment direction.

7. The apparatus according to claim 5, wherein the apparatus further comprises a cutting device, wherein the cutting device comprises a support member with a cutting surface for supporting the strip and a feeding member for feeding the strip onto the cutting surface in a feeding direction that is parallel to the intersecting line, wherein the cutting device is provided with a cutter that is movable along a cutting line for cutting off one or more strips from a continuous strip at a cutting angle that is oblique with respect to the feeding direction, wherein the alignment surface and the cutting surface are coplanar, wherein the apparatus comprises a proximity drive that is arranged for moving the alignment member at least partially onto the cutting surface parallel to the intersecting line into a position as close as possible to the cutting line.

8. The apparatus according to claim 7, wherein the support member is rotatable about a rotation axis for adjusting the cutting angle, wherein the proximity drive comprises a transmission for converting the rotation of the support member into the movement of the alignment member parallel to the intersecting line.

9. The apparatus according to claim 8, wherein the support member has a circular circumference that is concentric to the rotation axis, wherein the transmission comprises a first belt that extends around the circular circumference of the support member and a second belt that extends in a loop around a first pulley and a second pulley, wherein the alignment member is connected to and movable together with the second belt in a direction parallel to the intersecting line, wherein the first belt is arranged for driving the first pulley in a transmission ratio to the rotation of the support member such that the alignment member is moved in response to the rotation of the support member to maintain the alignment member in a position as close as possible to the cutting line.

10. The apparatus according to claim 4, wherein the one or more correction elements are provided in or on the alignment member.

11. The apparatus according to claim 10, wherein the one or more correction elements are provided at the abutment surface and face in the abutment direction.

12. The apparatus according to claim 4, wherein the intersecting line is a reference line on the alignment surface for aligning the strip, wherein alignment member is movable in the abutment direction at least up to the reference line.

13. The apparatus according to claim 12, wherein the alignment member is movable in the abutment direction from a first position at a first distance from the reference line into a second position at a second distance, smaller than the first distance, from the reference line.

14. The apparatus according to claim 13, wherein the displacement force exerted by the one or more correction elements onto the strip is insufficient to displace the strip in the correction direction when the alignment member is between the first position and the second position.

15. The apparatus according to claim 13, wherein the first distance is more than eight millimeters or more than ten millimeters.

16. The apparatus according to claim 13, wherein the second distance is in the range of five to eight millimeters.

17. The apparatus according to claim 13, wherein the alignment member is movable in the abutment direction from the second position into a third position at the reference line.

18. The apparatus according to claim 17, wherein the displacement force exerted by the one or more correction elements onto the strip is sufficient to displace at least a part of the strip in the correction direction into abutment with the abutment surface when the alignment member is between the second position and the third position.

19. The apparatus according to claim 1, wherein the apparatus is arranged for correcting misalignment of a strip containing ferromagnetic reinforcement elements, wherein the one or more correction elements comprises one or more correction magnets for magnetically attracting the strip in the correction direction.

20. The apparatus according to claim 19, wherein the one or more correction magnets are permanent magnets.

21. The apparatus according to claim 19, wherein the one or more correction magnets form a first magnetic field array, wherein the apparatus further comprises a gripper that is positionable in a pick-up position for picking up the strip from the alignment surface, wherein the gripper comprises a plurality of gripper magnets that form a second magnetic field array for retaining the strip to the gripper, wherein the first magnetic field array is at least partially offset with respect to the second magnetic field array.

22. The apparatus according to claim 21, wherein the plurality of correction magnets comprises a first group of correction magnets that face towards the gripper in the pick-up position with a north magnetic polarity and a second group of correction magnets that face towards the gripper in the pick-up position with a south magnetic polarity, wherein the correction magnets of the first group alternate with the correction magnets of the second group within the first magnetic field array.

23. The apparatus according to claim 21, wherein a pitch between the correction magnets is different from a pitch between the gripper magnets.

24. The apparatus according to claim 1, wherein the correction device further comprises one or more fixation elements for fixating the strip with respect to the alignment surface after the strip has been displaced by the one or more correction elements.

25. The apparatus according to claim 24, wherein the one or more fixation elements are switchable between an active state for magnetically fixating the strip with respect to the alignment surface and an inactive state for releasing the strip from the alignment surface.

26. A method for correcting misalignment of a strip using an apparatus according to claim 1, wherein the method comprises the steps of supporting the strip on the alignment surface, using the one or more correction elements to exert the displacement force onto the strip in the correction direction and thereby causing at least a part of said strip to move over the alignment surface in said correction direction.

27. The method according to claim 26, wherein the one or more correction elements act on the strip primarily in the correction direction.

28. The method according to claim 27, wherein the one or more correction elements act on the strip solely in the correction direction.

29. The method according to claim 26, wherein the apparatus comprises an alignment member with an abutment surface that extends parallel to the intersecting line and faces in an abutment direction opposite to the correction direction, wherein the one or more correction elements are provided in or on the alignment member, wherein the method comprises the step of moving the alignment member in the abutment direction towards the strip.

30. The method according to claim 29, wherein the intersecting line is a reference line on the alignment surface for aligning the strip, wherein the method comprises the step of moving the alignment member in the abutment direction at least up to the reference line.

31. The method according to claim 30, wherein the method comprises the step of moving the alignment member in the abutment direction from a first position at a first distance from the reference line into a second position at a second distance, smaller than the first distance, from the reference line, wherein the displacement force exerted by the one or more correction elements onto the strip is insufficient to displace the strip in the correction direction when the alignment member is between the first position and the second position.

32. The method according to claim 31, wherein the method comprises the step of moving the alignment member in the abutment direction from the second position into a third position at the reference line, wherein the displacement force exerted by the one or more correction elements onto the strip is sufficient to displace at least a part of the strip in the correction direction into abutment with the abutment surface when the alignment member is between the second position and the third position.

33. The method according to claim 26, wherein the strip contains ferromagnetic reinforcement elements, wherein the displacement force is a magnetic attraction in the correction direction.

34. The method according to claim 26, wherein the method comprises the step of cutting off one or more strips along a cutting line at a cutting angle and feeding said cut-off strip in a feeding direction parallel to the intersecting line onto the alignment surface of the correction device, wherein the cutting angle is adjustable, wherein the method further comprises the step of moving the alignment member in a direction parallel to the intersecting line in response to the adjustment of the cutting angle to position/or maintain the alignment member in a position as close as possible to the cutting line.

* * * * *